United States Patent [19]

Smith et al.

[11] Patent Number: 5,513,000
[45] Date of Patent: Apr. 30, 1996

[54] AUTOCOLLIMATOR

[75] Inventors: Stephen R. Smith, Lawrenceville; John L. Lowrance, Princeton, both of N.J.

[73] Assignee: Princeton Scientific Instruments Inc., Monmouth Junction, N.J.

[21] Appl. No.: 96,550

[22] Filed: Jul. 26, 1993

[51] Int. Cl.$^6$ .............................. G01B 11/26; G01C 1/00
[52] U.S. Cl. ..................... 356/152.2; 356/139.03
[58] Field of Search ............................. 356/152.2, 139.03

[56] References Cited

U.S. PATENT DOCUMENTS

| | | | |
|---|---|---|---|
| 4,243,877 | 1/1981 | Cruz | 250/201 |
| 4,603,976 | 8/1986 | Fetzer et al. | 356/402 |
| 4,618,768 | 10/1986 | Weigel | 250/334 |

FOREIGN PATENT DOCUMENTS

| | | | |
|---|---|---|---|
| 3024914 | 2/1982 | Germany | 356/152.2 |
| 0643750 | 1/1979 | U.S.S.R. | 356/152.2 |
| 0873104 | 7/1961 | United Kingdom | 356/152.2 |

*Primary Examiner*—Stephen C. Buczinski
*Attorney, Agent, or Firm*—Henry Schanzer; Michael Epstein

[57] ABSTRACT

An autocollimator having particular utility in optical aiming systems for the cannons of battle tanks comprises a pair of light sources for directing two beams of light along different paths towards a light reflector mounted, for example, on the muzzle of a tank barrel. The two beams of light are thus reflected along different paths towards a position sensitive light detector suitable for providing an output electrical signal indicative of both the receipt thereon of one or both of the reflected light beams and the position of the light beams on the light detector. The light sources are alternately turned on and off in non-overlapping time periods to provide identification of which of the two beams is being detected by the light detector.

17 Claims, 4 Drawing Sheets

5,513,000

AUTOCOLLIMATOR

BACKGROUND OF THE INVENTION

This invention relates to autocollimators and, in particular, to autocollimators adapted to make measurements over a wide angular range. Autocollimators are known telescope-like optical instruments for measuring small angular displacements of a test object from a plane in a line of sight of the instrument. A beam of light is projected onto a reflective surface of the test object and reflected back to a light detector. Changes in the path of the reflected light beam back to the reflector, resulting from angular displacements of the test object, are detected and measured. Such autocollimators are the subject of U.S. Pat. No. 3,554,653, 3,542,478; 3,977,789; 3,470,377; 4,650,298; 4,774,405; 4,890,917; 4,909,625; and 4,975,565; the subject matter of which is incorporated herein by reference.

In general, autocollimators are "static" measuring devices, i.e., they are precision devices used for measuring the results or progress of scientific experiments and manufacturing processes, e.g., in checking the flatness of machine beds and surface plates. A good example of such an autocollimator, and one which has particular relevance to the present invention, is disclosed in U.S. Pat. No. 3,554,653. This patent (Zielke et al.) discloses a pair of modulated light sources for directing two slightly spaced apart beams of light towards an external reflector mounted on an object being measured. In the null position, the light reflected from neither beam enters a light receiving aperture of a light sensor. However, upon angular displacement of the external reflector, one or the other reflected beams of light enters the aperture and generates a signal indicating that a displacememt has occurred and the direction of the displacement. For actual measurement of the angular displacement, the light beams are caused to pass through a movable optical wedge, the position of which causes a variable displacement of the paths of the reflected beams. In use, the apparatus is first arranged to provide a zero or null output signal, a measurement is then made resulting in an output signal, and the optical wedge is then moved in a direction for re-establishing the null condition. The amount of movement of the wedge is a direct measurement of the angular displacement of the test object. The mechanical system disclosed in the patent is obviously quite slow in operation and has limited utility, even if mechanized for faster operation, in systems requiring substantially instantaneous feedback information.

One application requiring such substantially instantaneous feedback, and in which the present invention has particular utility, is in the aiming of the armaments of moving vehicles, in particular, the aiming of the main gun or cannon of an armoured vehicle, e.g., a battle tank as shown in FIG. 6.

As known, such guns are optically aimed, e.g., using laser beams, and for accurate firing, it is essential that the gun barrel be precisely aligned with the line of sight of the optical aiming device. A problem, however, is that when the vehicle is moving, the gun barrel, (see FIG. 6) which can be quite long, e.g., 15 feet, experiences small degrees of bending even with highly effective gyroscopic stabilizing systems. Even small barrel deflections, particularly with the longest length barrels, provide a significant deviation between the true aim of the barrel and the line of sight of the aiming mechanism.

A proposed solution is to measure the degree of deflection of the gun muzzle with respect to its trunion and to correspondingly adjust the aim of the gun taking into account the amount of deflection. In a dynamic situation, however, i.e, in a moving vehicle where the degree of deflection is constantly changing, the adjustment must be extremely rapid and the measurements of the angular displacement of the muzzle must be correspondingly rapid. The proposed solution utilizes an autocollimator, but it is clear that the autocollimator disclosed in the aforediscussed Zielke et al. patent operates far too slowly for this operation.

Another problem in the moving vehicle application is that at high speeds and over rough terrain the range of angular displacement of the gun muzzle can be quite large in comparison with the range of displacements measurable by typical autocollimators. Thus, the autocollimator used must be capable of measuring unusually large deviations. In the Zielke et al. arrangement, the range of measurements possible is determined by the range of movements of the optical wedge. While a large range of measurements is thus possible, as above-noted, the mechanical system of Zielke at al. suffers from slow speed.

Further, even in the Zielke et al. arrangement, an ultimate limitation on the maximum range of possible measurements is that with excessively large angular deviations of the test object, the reflected light follows a path so divergent from the outgoing beam of light as to entirely miss, i.e., pass to one side of, the optical aperture of the light receiving mechanism. One solution is simply to increase the size of the optical aperture. Even this solution has its practical limits and, in any event, is generally undesirable as increasing the size, increases the cost and, particularly in a military operation, the vulnerability of the autocollimator system.

It turns out that, while not recognized by Zielke et al., and not discussed in their patent, the use of two beams of light is an effective means for increasing the range of measurements possible with an autocollimator, and is the means employed in the present invention for achieving an autocollimator measuring system having a wide measuring range relative to the size of the optical aperture of the system.

SUMMARY OF THE INVENTION

An autocollimator, according to one embodiment of the invention, comprises two light sources and an optics system for directing light beams from the two sources along slightly non-parallel paths towards a reflector mounted on an object, e.g., a gun muzzle, whose movement is to be measured. For a null or non-displaced position, the reflector reflects both beams, again along slightly non-parallel paths, into the optical aperture of a light receptor and onto different portions of a surface of a position-sensitive light detector, i.e., one that provides a signal indicating both the detection of incident light and the position on the detection surface where the light is incident. As the reflector is angularly displaced, in response to movement of the object on which it is mounted, the positions of incidence of the light beams on the detector surface change. By different means, such as multiplexing or modulation of the different light beams, each beam can be individually identified for providing, from the light detector, instantaneous signals indicating both the direction and magnitude of the angular displacement of the light reflector. The use of two angularly displaced beams increases the range of displacements measurable because valid measurements are obtained even when the reflector displacement is large enough to move one of the reflected beams entirely outside the optical aperture whereby it does not impinge onto the light detector surface, provided at least a portion of the other light beam enters the aperture.

In one embodiment, two light sources, differing in wavelength or other optical characteristic, project two light beams along the same or different paths towards a reflector including means, such as a prism or a dichroic mirror at the reflector, for separating the two beams and reflecting them along slightly displaced paths back towards the optical aperture and the light detector.

BRIEF DESCRIPTION OF THE DRAWING

FIGS. 1a–3a are schematic views showing the interception of the reflected light beams by the optical aperture of the autocollimator in correspondence with the angular positions of the light reflector shown in FIGS. 1–3, respectively.

DESCRIPTION OF PREFERRED EMBODIMENTS

The design and use of autocollimators are generally known, as disclosed in the aforecited patents, for example, and the following description concentrates merely on the novel elements of the inventive system. Persons of skill in the art will have no difficulty implementing the invention.

Figure 1:
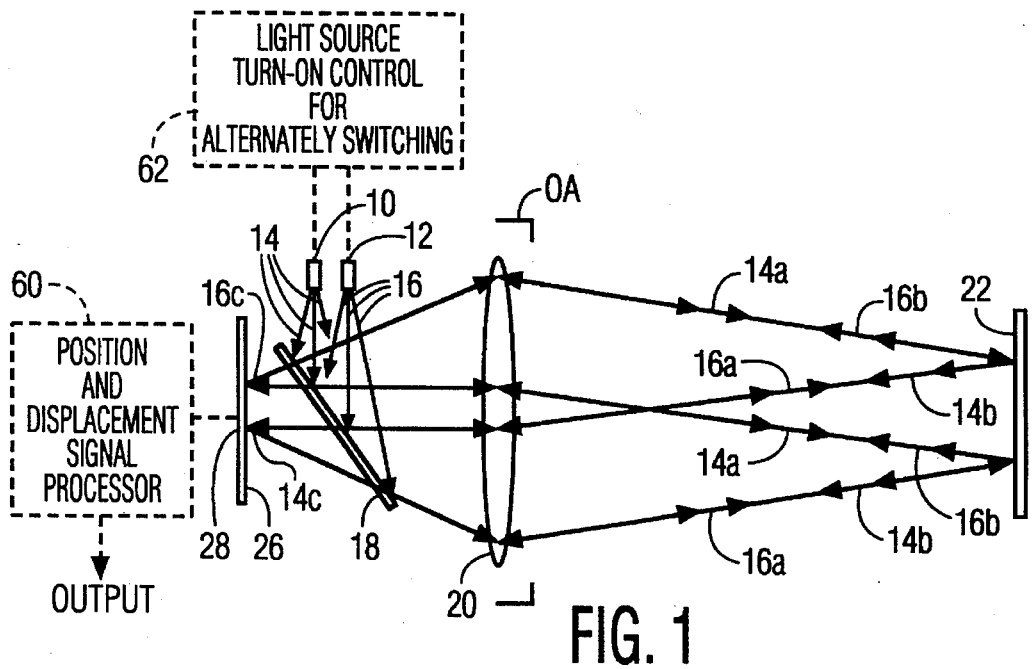
FIG. 1 is a schematic view of an autocollimator in accordance with one embodiment of the invention showing a "null" condition of measurement.

Thus, as shown schematically in FIG. 1, one embodiment of the invention comprises a pair of identical light sources 10 and 12 fixedly mounted (by known means) in the focal plane of a lens 20 to direct two beams 14 and 16 of light towards a beam splitter 18. The two beams are reflected towards a lens 20 which collimates each beam into a beam of substantially parallel light rays directed towards a distant light reflector 22. Each light beam has a circular cross-section (see, for example, FIGS. 1a–3a which illustrate the reflected light beams), and, for the purpose of showing the paths of the two beams, a pair of projected light rays 14a and 16a is shown for each beam 14 and 16 of light rays. Because of the slight displacement of the light sources 10 and 12 in the focal plane of the lens 20, the light beams 14 and 16 are slightly angularly displaced from one another as they reach each portion of the lens 20. After leaving the lens, the collimated light beams 14 and 16 are also slightly angularly offset from one another as schematically illustrated by the light rays 14a and 16a.

Figure 6:
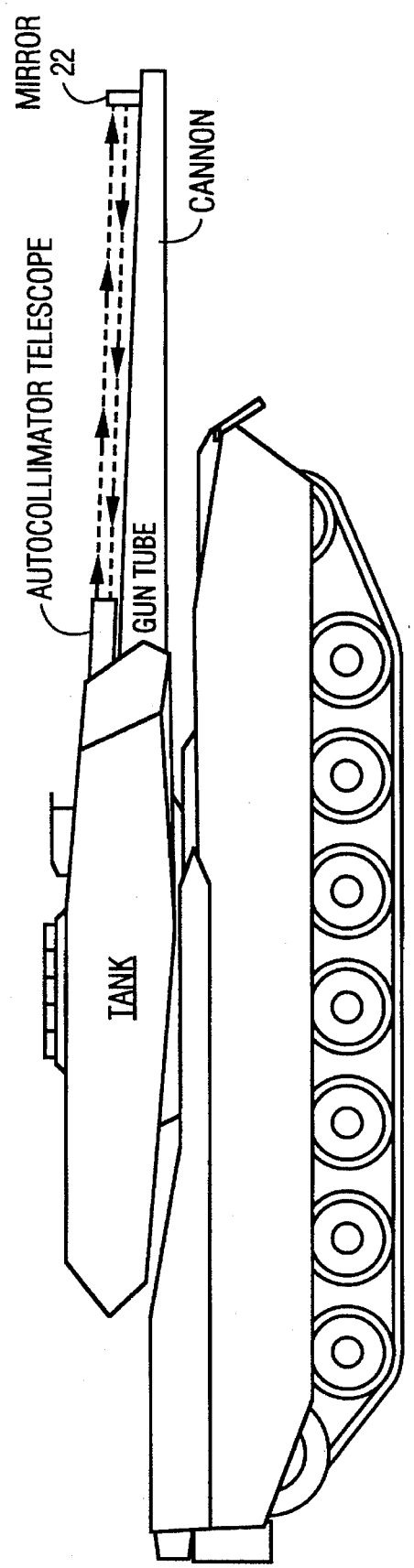
FIG. 6 is a drawing of a cannon mounted on a tank with an autocollimator mounted on the breech end of the cannon for projecting a beam of light onto a reflecting mirror mounted on the far end of the cannon.

In this embodiment, the light reflector 22 is a conventional mirror of the type used in autocollimator configurations which is mounted on an object or surface whose displacement angle is to be measured relative to the optical axis of the autocollimator. As previously noted, one application in which the invention has particular utility is in a system for aiming a cannon of a battle tank (see FIG. 6). In such application, the light reflector 22 is mounted at the muzzle end of the cannon barrel facing rearwardly, and the remainder of the autocollimator elements are disposed in a suitable housing mounted on the breech end of the cannon barrel as shown in FIG. 6. Thus, regardless of aiming movements of the cannon barrel, the elements of the autocollimator remain in optical alignment subject only to displacements caused by relative movements between the ends of the barrel caused by flexure of the barrel itself.

The collimated light beams 14 and 16 are reflected (e.g., light rays 14b and 16b) from the light reflector 22 along slightly differently angled paths towards the light receiving optical aperture OA of the light receiving portion of the system, and the reflected light beams entering the optical aperture OA are focused to point images by the lens 20 (the beam splitter 18 being semi-transparent to the reflected beams) onto a light sensitive surface 26 of a position sensitive light detector 28. Because of the angular displacement between the two reflected light beams, the point images 14c and 16c thereof, respectively, are slightly spaced apart from each other on the detector surface.

Figure 1A:
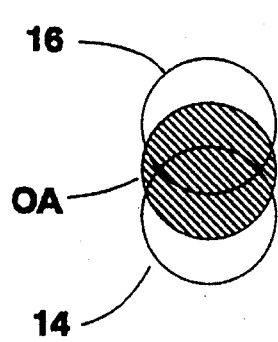

The incidence of the two reflected light beams 14 and 16 onto the optical aperture of the light receiving portion of the system is illustrated in FIG. 1a where the optical aperture OA is illustrated by a diagonally shaded circle OA and the two reflected light beams by the circles 14 and 16. The two reflected beams partially overlap, and a portion of each beam passes outside the optical aperture.

The light detector 28 is of known type providing an output signal indicative of the incidence of light and the position of the light on the detector surface. The position sensor and signal processor is represented by box 60 in FIG. 1. An example of such known light detector is a silicon, two dimensional position sensor such as Hamamatsu Corporation's model no. S1300. Alternatively, the presence and position of the point images 14c and 16c in the focal plane of the lens 20 can be determined by direct vision through an eye piece and reticle system.

In the condition illustrated in FIGS. 1 and 1a, the light reflector 22 is at its "rest" or non-displaced position, e.g., with the tank cannon barrel completely stationery. In such position, the detector 28 generates two signals corresponding respectively to each beam 14 and 16. That is, in this embodiment, each light source 10 and 12 is alternately switched on and off (see light source turn-on control for alternately switching, 62, in FIG. 1) so that the light from only one light source at a time reaches the light detector. Identification of electrical signals corresponding to signal sources operating at different and non-overlapping time periods is a well-known technique (see, for example, the Zielke et al. patent which describes the use of a particular modulation scheme) and not described herein. Other modulation schemes may be used as alternative means of identifying the electrical signals corresponding to the two sources 10 and 12.

Figure 2:
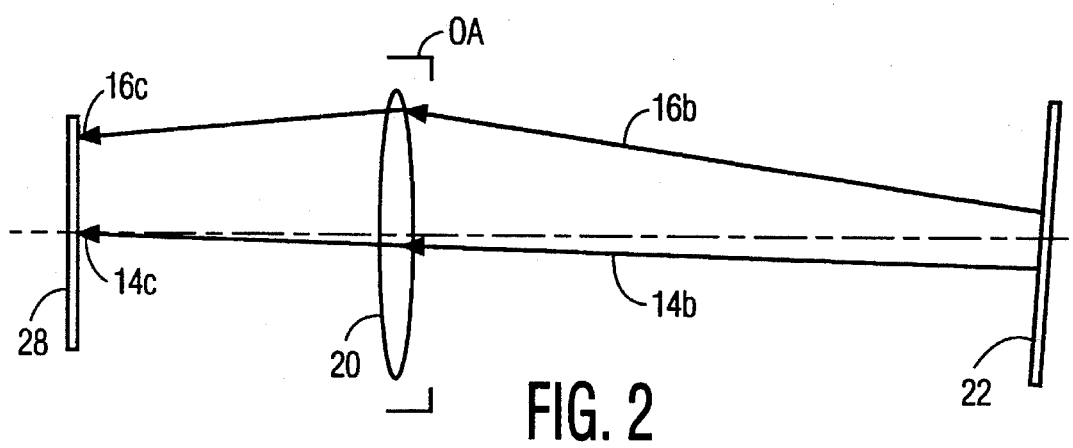
FIGS. 2 and 3 are simplified views corresponding to FIG. 1 but showing the results of deflections of the light reflector.
Figure 2A:
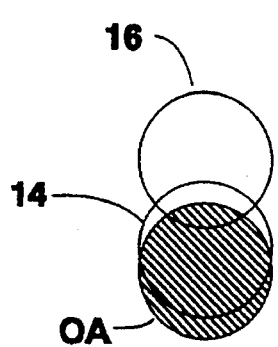
Figure 3A:
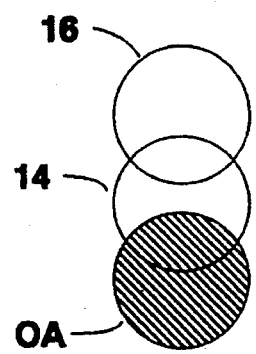

FIG. 2 shows a condition when the light reflector 22 is angularly displaced from its rest position as a result, for example, of flexure of the cannon barrel on which it is mounted. In such case, both light beams 14 and 16 (identified by light rays 14b and 16b) are reflected along paths slightly angularly displaced from the "at rest" reflected beams illustrated in FIG. 1. In this condition, although the points of incidence 14c and 16c of both light beams are displaced from their "at rest" points of incidence as shown in FIG. 2, both beams 14 and 16 still overlap the optical aperture (FIGS. 2 and 2a) and reach the detector 28 which signals the new points of incidence.

The changes in the positions of the points of incidence of the reflected light beams are directly related to both the direction and magnitude of the angular displacement of the light reflector and are directly indicated by the electrical output signals from the light detector. These signals are immediately useable in a system for adjusting the aiming of the cannon to correct for the instantaneous flexure of the cannon barrel. The speed at which such feedback corrections can be made is primarily a function of the speed of response of the light detector 28, which, for light detectors of the aforementioned type, is in the order of microseconds. Available electronic signal processors are even faster than this, hence feedback corrections at the rate of approximately 1,000 corrections per second are readily available. With typical tank barrels of a length of around 15 feet, this corresponds to a feedback correction for angular deviations as low as approximately 10 microradians.

Figure 3:
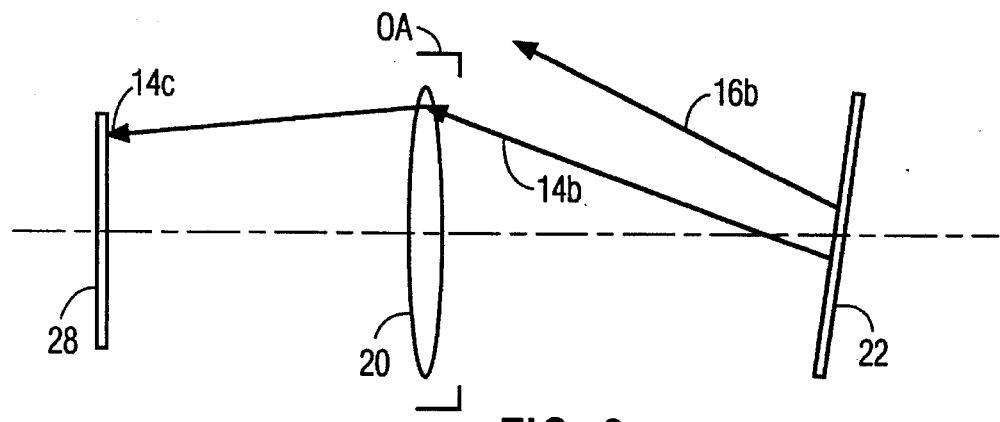

FIG. 3 shows a condition where the light reflector 22 is angularly displaced an additional amount from the displacement shown in FIG. 2, and to the extent where the reflected light beam 16b does not intercept the optical aperture OA (FIGS. 3 and 3a), hence does not reach the light detector surface. However, the other reflected light beam 14b still enters the optical aperture and reaches the detector surface 28, and the single output signal, derived from the one beam 14b, is still adequate for providing an exact measurement of the angular displacement of the light reflector 22. This results from the fact that, as above-described, each reflected beam 14b and 16b is individually identified when it reaches the light detector 28, and the receipt thereof indicates not only the angular deflection of the light reflector 22, but the direction of the deflection thereof as well.

As previously noted, an advantage of the use of two angularly displaced reflected light beams is that the range of measurable angular displacements is increased over the range of measurements obtainable with a single reflected light beam with a given lens and light detector. Thus, as a first reflected light beam (e.g., beam 16b) moves outside the optical aperture, valid measurements are continued while the second light beam (e.g., beam 14b) remains incident thereon. Likewise, for reflector 22 displacements in the other direction, valid measurements are continued after the second light beam (14b) misses the optical aperture while the first light beam (16b) remains incident thereon.

Figure 4:
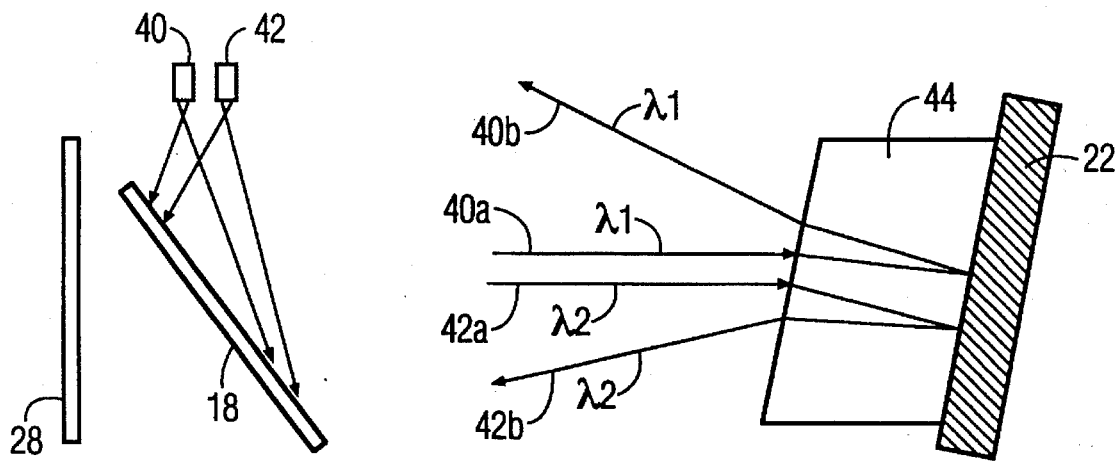
FIG. 4 is a view similar to FIGURE I but showing a second embodiment of the invention.
Figure 5:
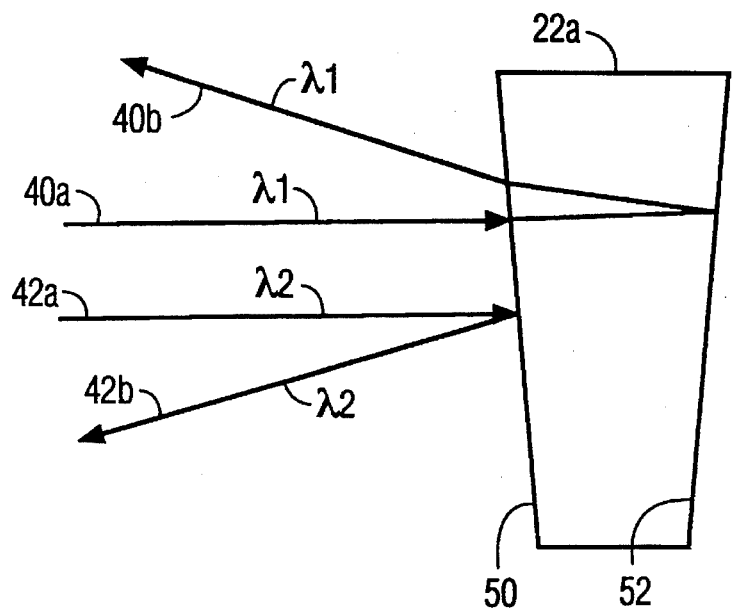
FIG. 5 is a view of the reflector portion of a third embodiment of the invention.

In the embodiment described in connection with FIGS. 1–3, the angular displacement between the two reflected beams 14 and 16 is obtained solely by projecting the two light beams 14 and 16 along slightly differently angled paths. FIGS. 4 and 5 show two embodiments where means are provided (such as prisms or dichroic mirrors) at the reflector for accentuating the angular displacement of the reflected light beams. The several means for generating angular displacements of the two beams may be used singly or in combination.

In both the FIGS. 4 and 5 embodiments, the two light sources 40 and 42 transmit beams of different optical characteristics. For example, the source 40 can transmit light having a wavelength of 6,000 A° (λ1) and the source 42 a light having a wavelength of 8,000 A° (λ2). (Also, while the term "light" is used, non-visible wavelength radiations can be used.)

In the embodiment shown in FIG. 4, a prism 44 is fixedly mounted, as by gluing, on the light reflector 22 between it and the light sources 40 and 42. The prism 44, as known, refracts the light beams differing amounts dependent upon the wavelength thereof. For example, two light rays 40a (λ1) and 42a (λ2), substantially parallel but of different wavelengths, follow differently angled paths through the prism 44, as shown, and are reflected back towards the light detector 28 along slightly angularly displaced paths 40b and 42b. The two reflected beams 40b and 42b function similarly to the reflected beams 14b and 16b shown in FIGS. 2 and 3 for indicating angular displacements of the reflector 22.

In the embodiment shown in FIG. 5, the reflector 22a comprises a wedge shaped dichroic mirror having front 50 and rear 52 reflecting surfaces. As known, the mirror surfaces are or are not transparent to light dependent upon the wavelength thereof. Thus, in this example, the light ray 42a (λ2) does not penetrate the front surface 50 but is reflected therefrom along the return path 42b. Conversely, the light ray 40a (λ1) is transmitted through the front surface 50 to be reflected from the rear surface 52. The two surfaces 50 and 52 are slightly angularly displaced from one another, hence the reflected light beams 40b and 42b are similarly mutually angularly displaced.

In both FIGS. 4 and 5, the angular deviations between the reflected light rays are greatly exaggerated for purposes of illustration.

The two projected light beams, and their two rays 40a and 42a, may or may not be parallel in the plane of FIGS. 4 and 5, depending on whether the sources 40 and 42 are separated in the plane of FIG. 4, or separated in directions perpendicular to the plane of FIG. 4 or whether they are optically superimposed by an auxiliary beam splitter.

While the two reflected beams can be differentiated by time separation means, as previously explained, different wavelength beams can also be differentiated by means of spectral band pass filters disposed in front of separate light detectors, not illustrated. This, however, adds physical complexity, and the preferred differentiation means is by time differentiation (time multiplexing).

As illustrated, the two light sources 10 and 12 (FIG. 1) are spaced apart in the plane of the drawing, thereby providing vertically spaced apart reflected light beams (FIGS. 1a–3a) for increasing the range of measurements of angular displacements of the reflector 22 about a horizontal axis. However, if the light sources are, instead, spaced apart in directions perpendicular to the plane of the drawing, the reflected light beams are spaced apart horizontally and are effective for increasing the range of measurements for displacements about a vertical axis.

Also, increased ranges of measurement for both horizontal and vertical displacements of the cannon barrel can be obtained using two pairs of reflected beams, each pair for a respective axis of rotation of the light reflector. Time multiplexing schemes can be used for individually identifying each of the four beams being individually reflected towards the light detector.

By way of illustration, in one embodiment where the reflector 22 (FIG. 1) is located 15 feet from the optical aperture OA, the lens 20 has a diameter of 3 inches and a focal length of 20 inches. The two light sources 14 and 16 comprise light emitting diodes (LEDs), 2 millimeters in diameter, emitting light at a wavelength of 640 nanometers into a cone having a 15 degree half angle and are spaced apart, between centers of the two light sources, by ⅕th of an inch.

What is claimed is:

1. An autocollimator for providing an output signal indicative of the angular displacement of a light reflector, the autocollimator comprising two sources of light for producing two light beams and means for directing said two light beams from said two sources onto a light reflector, means causing reflection of said two light beams from said reflector along different return light paths towards a position sensitive light detector means for providing an output signal indicative of the receipt thereon of a light beam and the position of the light beam thereon, and means for identifying each one of said two light beams being received by said light detector means for producing a signal indicative of the angular displacement of the light reflector in response to each one of said two light beams being incident on said detector means, wherein the angular displacement of the reflector is determined even when only one of the two light beams is incident thereon, wherein the two beams increase the range of measurable angular displacement which the light reflector undergoes.

2. An autocollimator according to claim 1 including a lens for directing said light beams; and wherein said two light sources are laterally offset from one another within the focal plane of said lens for directing said two beams along different outward paths towards said light reflector.

3. An autocollimator according to claim 2 wherein said light reflector is a mirror for reflecting said two beams arriving along said different outward paths backwardly along said different return paths.

4. An autocollimator according to claim 1 wherein said two light sources direct two beams of different wave length light towards said light reflector, and said light reflector includes means for differently reflecting said two beams along said different return paths in response to the different wavelengths of the two beams.

5. An autocollimator according to claim 4 wherein said means for differently reflecting said two beams includes a prism disposed in the path of said beams towards a mirror reflecting surface.

6. An autocollimator according to claim 4 wherein said means for differently reflecting said two beams comprises a pair of dichroic mirror surfaces.

7. An autocollimator according to claim 1 wherein said means for identifying each of said two beams comprises transmitting and receiving each of said two beams in alternating, non-overlapping time periods.

8. An autocollimator for providing an output signal indicative of the angular displacement of a light reflector, the autocollimator comprising:

illuminating means and optic means for producing first and second light beams and for projecting the two light beams onto said light reflector located at a predetermined distance from said light source;

said reflector reflecting the two light beams a long different return light paths towards a position sensitive light detector means located adjacent to said optic means;

said light reflector being subject to angular displacement; and said light reflector when in a first position reflecting both light beams onto said light detector; and the light reflector when displaced in one direction relative to said first position, causing the first and second light beams to move in a first direction across the light detector means, with the first beam preceding the second beam; and the reflector when displaced in another direction, opposite to the one direction, causing the first and second light beam to move in a second direction opposite the first direction across the light detector means, with the first beam following the second beam; and said light detector means being responsive to the incidence of each one of said first and second light beams and including means for producing a signal indicative of the angular displacement of the reflector in response to each light beam reflected from the reflector onto said light detector means for enabling the light detector means to produce a signal indicative of the angular displacement of the reflector even when only one of the first and second light beams is incident thereon, whereby the two beams increase the range of measurable angular displacement which the light reflector undergoes.

9. The autocollimator as claimed in claim 8 wherein the illuminating means is comprised of two separate light sources which are offset with respect to each other.

10. The autocollimator as claimed in claim 8 wherein the light reflected from the reflector passes through an optical aperture located in front of, and adjacent to, said light detector means.

11. The autocollimator as claimed in claim 8 wherein the light reflector is a mirror mounted at the muzzle end of a cannon barrel protruding from a tank and wherein the illuminating means, the optic means and the light detector means are located in a housing mounted at the breech end of the cannon barrel.

12. The autocollimator as claimed in claim 8 wherein the first and second light beams are reflected back towards said light detector means via slightly non-parallel paths.

13. The autocollimator as claimed in claim 8 wherein, when said light reflector undergoes a small angular displacement in any direction from said first position, at least a portion of one of said first and second light beams reflected from the light reflector illuminates said position detector means.

14. An autocollimator comprising:

an illumination means and an optics system for producing first and second light beams and for directing the first and second light beams towards a light reflector located at a predetermined distance from the light source; where the light reflector is subject to angular displacement which is to be measured;

said reflector reflecting the two light beams back along slightly non-parallel paths towards an optical aperture of a light receptor and onto different portions of a surface of a position-sensitive light detector means;

said light detector means being responsive to the incidence of each one of said first and second light beams and including means for producing a signal indicative of the incidence of each one of said first and second light beams and the changes in the position, if any, of each beam; and wherein, for a non-displaced position of the reflector, both beams are reflected into the optical aperture of said light receptor and onto said light detector; and wherein, when the light reflector is subjected to angular displacement in one direction, the two light beams are caused to sweep across the optical aperture such that the first light beam precedes and moves ahead of the second light beam and, even when the first light beam is no longer incident on the optical aperture, so long as the second light beam is incident on the optical aperture, the second beam provides information as to the angular displacement of the reflector; and likewise, when the light reflector is subjected to angular displacement in an opposite direction to said one direction, the two light beams are caused to sweep across the optical aperture such that the first light beam moves behind the second light beam and, even when the second light beam is no longer incident on the optical aperture, so long as the first light beam is incident on the optical aperture, the first beam provides information as to the angular displacement of the reflector;

wherein the two beams increase the range of measurable angular displacement which the light reflector undergoes.

15. The autocollimator as claimed in claim 14 wherein the illuminating means is comprised of two separate light sources which are offset with respect to each other in the optical focal plane.

16. The autocollimator as claimed in claim 14 wherein the light reflector is a mirror mounted at the muzzle end of a cannon barrel protruding from a tank; and wherein the illuminating means, the optic means and the light detector means are located in a housing mounted at the breech end of the cannon barrel.

17. The autocollimator as claimed in claim 14 wherein, when said light reflector undergoes a small angular displacement in any direction from said non-displaced position, at least a portion of said first and second light beams reflected from the light reflector illuminates said position detector means.

* * * * *

UNITED STATES PATENT AND TRADEMARK OFFICE
CERTIFICATE OF CORRECTION

PATENT NO. : 5,513,000
DATED : April 30, 1996
INVENTOR(S) : Stephen R. Smith and John L. Lowrance It is certified that error appears in the above-indentified patent and that said Letters Patent is hereby corrected as shown below:

In column 1, after the title and before the BACKGROUND OF THE INVENTION, INSERT THE FOLLOWING CLAUSE:

GOVERNMENT CONTRACT

This invention was made with government support under Contract DAAA 21-91-C-0035 awarded by the United States Army. The government has certain rights in this invention.

Signed and Sealed this

Sixteenth Day of July, 1996

*Attest:*

BRUCE LEHMAN

*Attesting Officer*     *Commissioner of Patents and Trademarks*